Aug. 21, 1934.   J. W. MONTIGNEY   1,970,705
PORTABLE SECTIONAL SHIPPING AND STORAGE UNIT
Filed April 4, 1932   2 Sheets-Sheet 1
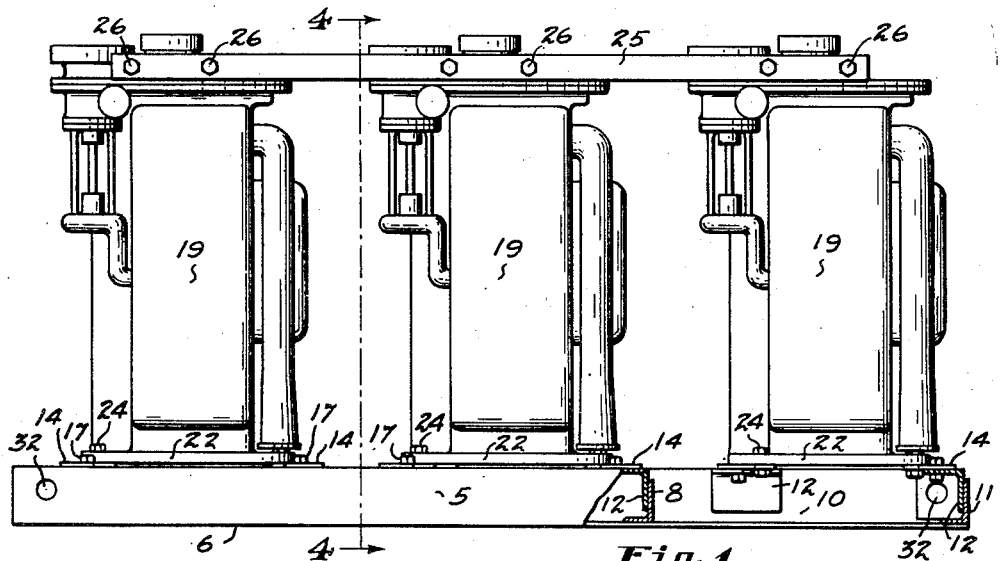
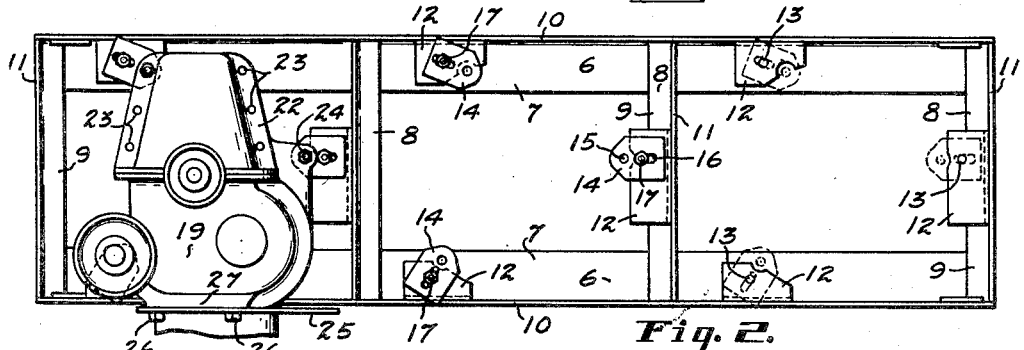
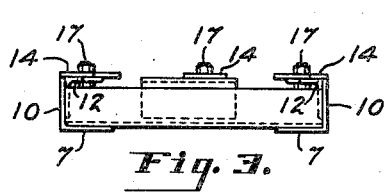
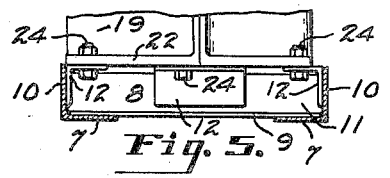
INVENTOR
John W. Montigney
BY George Douglas Jones
ATTORNEY Aug. 21, 1934.   J. W. MONTIGNEY   1,970,705
PORTABLE SECTIONAL SHIPPING AND STORAGE UNIT
Filed April 4, 1932   2 Sheets-Sheet 2

INVENTOR
John W. Montigney
BY George Douglas Jones
ATTORNEY

Patented Aug. 21, 1934

1,970,705

UNITED STATES PATENT OFFICE 1,970,705

PORTABLE SECTIONAL SHIPPING AND STORAGE UNIT

John W. Montigney, Cleveland Heights, Ohio

Application April 4, 1932, Serial No. 603,131

4 Claims. (Cl. 248—15)

This invention relates to shipping units and more particularly to the transportation and storage of internal combustion engines.

The cost of transporting and storing internal combustion engines or power plants has always been excessive, due mainly to the bulk of the units as compared to the weight of the same.

It has been the custom and practice to transport and store these units in the position in which they are to be mounted when in use, that is, the engines are mounted on a skid or platform in an upright horizontal position; engines in this position require approximately double the amount of space than engines mounted on the device as shown and claimed in this invention.

In the earlier development of internal combustion engines, mounting means, such as feet or brackets were built into the engine for supporting the same when in use; modern development has eliminated the necessity for the use of these brackets, the engine is mounted on what is termed a three point suspension, a support in the center and at the front end of the engine and the rear portion is attached to the bell housing or transmission housing, which in turn is supported on the frame of the vehicle.

To transport and store this modern power plant requires straps and expensive crates or platforms due to the difficulty encountered in rigidly securing the power plant to the transport platform.

It is also extremely expensive and difficult to transport these power plants in decked formation, unless substantial temporary decks are built into the transporting unit, such as a freight car.

Therefore, an object of this invention is to provide a shipping unit for power plants, which comprises a platform to which the power plants are attached in a vertical position.

Another object of my invention is to provide detachable mounting platforms which may be rigidly secured together, thus forming a plurality of transporting and storage platforms on which can be mounted the number of power plants desired.

A further object of my invention is to provide adjustable power plant securing means whereby various sizes of engines may be attached to the same platform.

Other objects of the invention will appear from the following description taken in connection with the drawings which form a part of the specification.

Fig. 1 is a side elevation of the shipping unit with a plurality of power plants mounted thereon.

Fig. 2 is a plan view of the shipping unit showing adjustable securing plates and a power plant mounted on one section of the unit.

Fig. 3 is an end elevation of the shipping unit.

Fig. 4 is a section taken through line 4—4 of Fig. 1.

Fig. 5 is a sectional view similar to Fig. 4 but with adjustable plates removed, and a different size motor mounted thereon.

Figure 6:
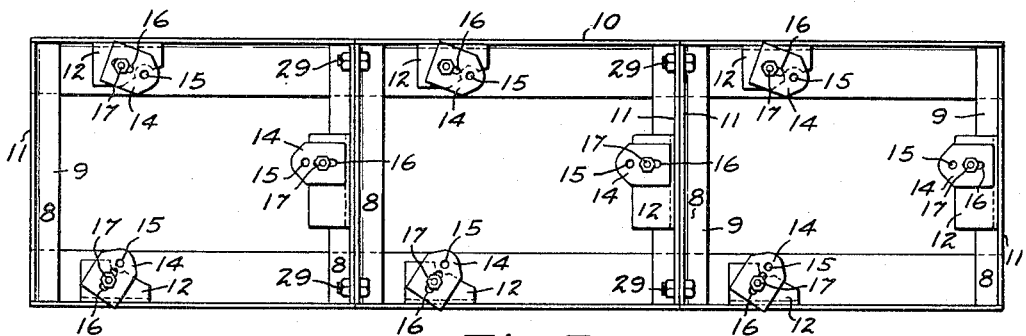
Fig. 6 is a plan view of a sectional type of shipping unit.
Figure 7:
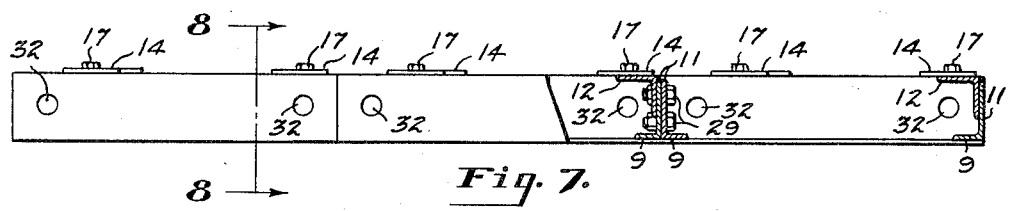
Fig. 7 is a side elevation of a sectional shipping unit.
Figure 8:
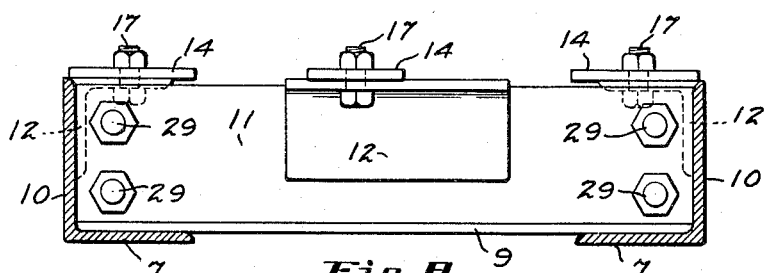
Fig. 8 is a section taken through line 8—8 of Fig. 7.

Referring now to the drawings by characters of reference wherein like numerals correspond to like parts. The reference numeral 5 indicates shipping unit or platform. The platform is preferably constructed in elongated shape. The side rails 6 are angle sections, the outstanding leg 7 is preferably placed at the bottom portion of platform in order to slide or roll the unit. Cross members 8 are rigidly secured to the side members, the outstanding leg 9 of the cross members resting on and secured to the outstanding leg 7 of the side members. Secured to the upright leg 10 of the side members and upright leg 11 of the cross members are angle brackets 12 with apertures 13 therein. Adjustable plates 14 preferably of elongated shape having an aperture 15 towards the front thereof are provided. An elongated slot 16 is located towards the rear of the adjustable plate, through this elongated slot 16 and the aperture 13, securing means, preferably bolts 17, secure the adjustable plate to the supporting bracket.

Illustration shows a conventional internal combustion engine or power plant 19 with bell housing 22, the said bell housing having apertures 23. The apertures of the bell housing register with the apertures of the adjustable plates and bolts 24 secure the power plant to the platform. A strap 25 securely holds the motors in alignment by bolts 26 which are preferably screwed into the fan mounting 27 of the power plant.

The platform may be made in sections as illustrated in Figs. 6, 7, 8 and 9. These sections are fabricated in box-like structure, the cross members 8 having apertures 28 in the upright leg 11 through which bolts 29 secure the platforms, thus permitting a plurality of platforms to form a single structure.

Figure 9:
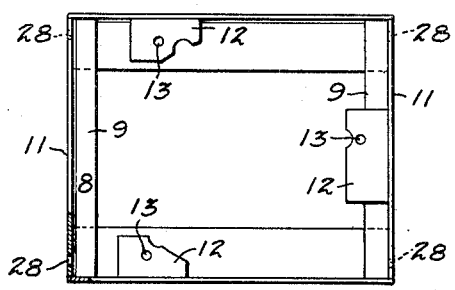
Fig. 9 is a plan view of a single section of shipping unit with adjustable securing plates removed.

It will be noted that the adjustable plates 14 can be removed and the motor may be secured to the brackets 12 as illustrated in Fig. 9.

Apertures 32 located at the ends of the elongated platform may be used for hooks or other means of moving the said platform.

While I have shown and described the preferred embodiment of the invention, it should be understood that I reserve the right to make such changes in the form, construction and arrangement of parts as will not depart from the spirit of the invention or the scope of the claims.

Having fully described my invention, what I claim is:

1. A portable shipping unit for internal combustion engines comprising a plurality of angle bars joined together to form a rectangular frame, brackets attached to said angle bars, pivoted article securing devices carried on said brackets and adapted to secure articles to said frame during shipment.

2. A portable shipping frame for heavy vertically elongated articles comprising an open rectangular frame fabricated of angle bars, equispaced cross brace angle bars joining the sides of said rectangular frame, article supporting brackets attached to said cross braces and pivoted article securing devices carried on said brackets.

3. A base for supporting a power plant in an upended position during shipment and storage comprising a skeleton frame of sufficient size to insure lateral stability and of sufficient depth to house and protect projections depending from the end of the said power plant, said frame having means for securing the power plant thereon and adapted when secured thereto to be handled as a unit with said plant.

4. A base for supporting a power plant in an upended position during shipment and storage comprising a skeleton frame of sufficient size to insure lateral stability and of sufficient depth to house and protect projections depending from the end of the said power plant, said frame having means for securing the power plant thereon, and means for attaching a plurality of said frames together, whereby a number of frames and power plants may be handled as a unit.

JOHN W. MONTIGNEY.